(12) United States Patent
Pard et al.

(10) Patent No.: US 9,481,413 B2
(45) Date of Patent: Nov. 1, 2016

(54) DRIVE TRACK FOR A TRACKED VEHICLE

(71) Applicant: BOMBARDIER RECREATIONAL PRODUCTS INC., Valcourt (CA)

(72) Inventors: Jean-Sebastien Pard, Tingwick (CA); Yvon Bedard, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 33 days.

(21) Appl. No.: 14/501,991

(22) Filed: Sep. 30, 2014

(65) Prior Publication Data
US 2015/0091373 A1 Apr. 2, 2015

Related U.S. Application Data

(60) Provisional application No. 61/884,450, filed on Sep. 30, 2013.

(51) Int. Cl.
*B62D 55/24* (2006.01)
*B62M 27/02* (2006.01)
*B62D 55/253* (2006.01)

(52) U.S. Cl.
CPC ............. *B62D 55/24* (2013.01); *B62D 55/253* (2013.01); *B62M 27/02* (2013.01); *B62M 2027/027* (2013.01)

(58) Field of Classification Search
CPC .. B62D 55/24; B62D 55/244; B62D 55/253; B62D 55/26
See application file for complete search history.

(56) References Cited

U.S. PATENT DOCUMENTS

| | | | | |
|---|---|---|---|---|
| 3,186,466 A | * | 6/1965 | Keinanen | B60C 11/16 152/210 |
| 4,616,883 A | * | 10/1986 | Edwards | B62D 25/12 305/199 |
| 5,984,438 A | * | 11/1999 | Tsunoda | B62D 55/24 305/169 |
| 7,422,295 B2 | * | 9/2008 | Rasmussen | B62D 55/07 305/165 |
| 7,780,247 B2 | | 8/2010 | Paradis et al. | |
| 2010/0095506 A1 | * | 4/2010 | Bair | B62D 55/24 29/402.08 |

* cited by examiner

*Primary Examiner* — John Walters
*Assistant Examiner* — James Triggs
(74) *Attorney, Agent, or Firm* — BCF LLP

(57) ABSTRACT

A drive track for a tracked vehicle has an endless belt having an inner surface and an outer surface, and a plurality of lugs projecting from at least one of the inner surface and the outer surface. At least some of the plurality of lugs each have at least one passage extending at least partially through the lug from an outer surface of the lug. A snowmobile provided with the drive track is also disclosed.

16 Claims, 12 Drawing Sheets

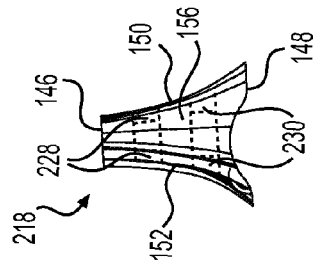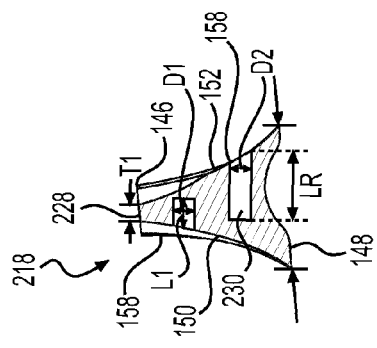
FIG. 6C
FIG. 6D
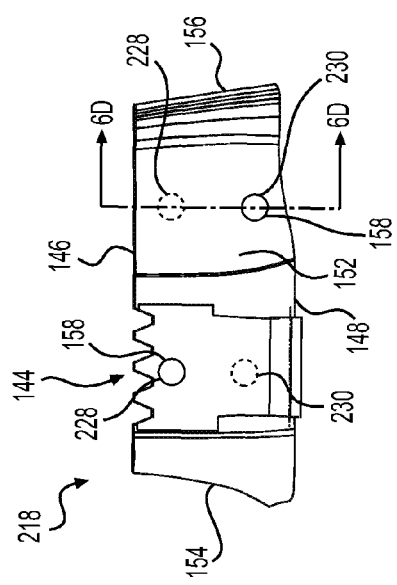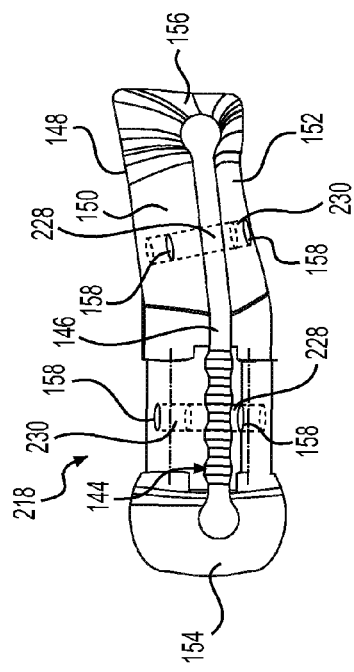
FIG. 6A
FIG. 6B

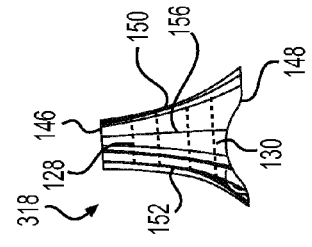
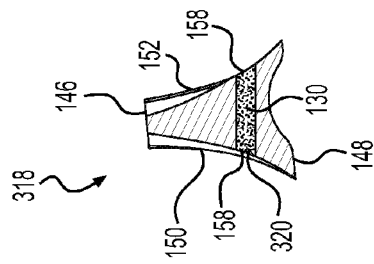
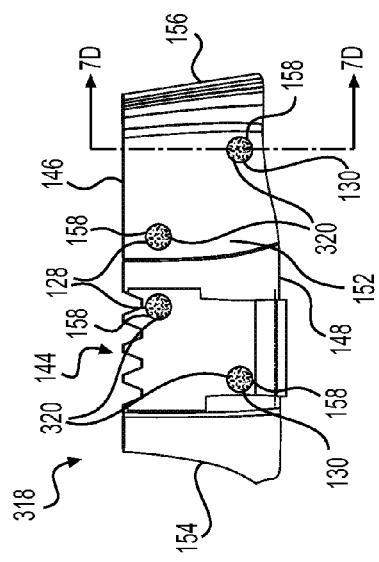
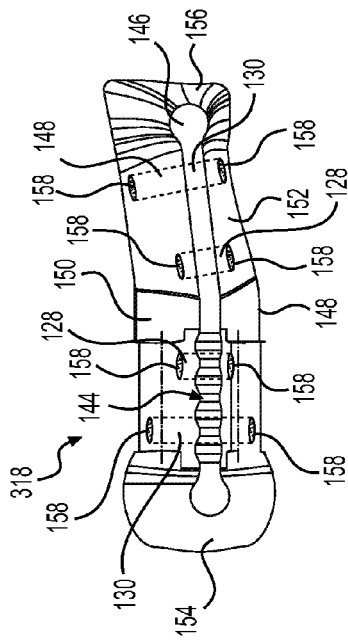

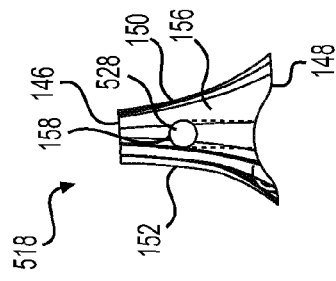
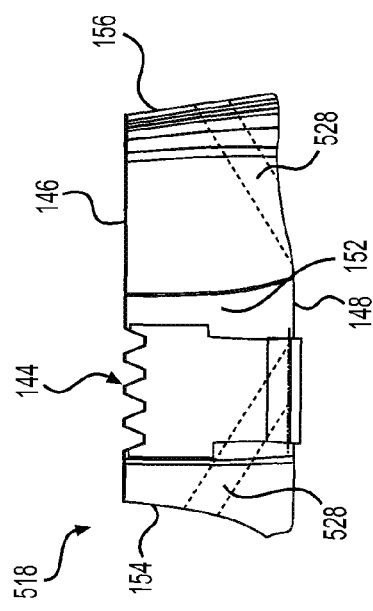
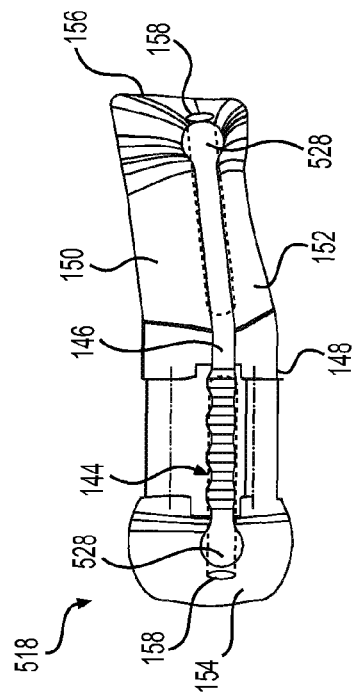

DRIVE TRACK FOR A TRACKED VEHICLE

CROSS-REFERENCE

The present application claims priority to U.S. Provisional Patent Application No. 61/884,450, filed Sep. 30, 2013, the entirety of which is incorporated herein by reference.

FIELD OF TECHNOLOGY

The present technology relates to drive tracks for tracked vehicles, and more specifically drive tracks for snowmobiles.

BACKGROUND

Vehicles such as snowmobiles are provided with endless drive tracks to enable traveling over surfaces such as snow and ice. The endless drive track is driven by the vehicle's engine via one or more sprockets that engage the endless drive track to move the drive track and thereby propel the vehicle.

In order to travel over soft-snow covered surfaces, the snowmobile needs to be as light as possible.

Also, in order to accelerate the drive track, the engine has to overcome the inertia of the drive track. Similarly, in order to decelerate the drive track, the braking system also has to overcome the inertia of the drive track. The heavier the drive track is, the more inertia needs to be overcome by the engine and braking system.

Therefore, it would be desirable to reduce the weight of the drive track.

SUMMARY

It is an object of the present technology to ameliorate at least some of the inconveniences present in the prior art.

According to one aspect of the present technology, there is provided a drive track for a tracked vehicle having an endless belt having an inner surface and an outer surface, and a plurality of lugs projecting from at least one of the inner surface and the outer surface. At least some of the plurality of lugs each have at least one passage extending at least partially through the lug from an outer surface of the lug.

In some implementations of the present technology, for each of the at least some of the plurality of lugs the at least one passage extends completely through the lug.

In some implementations of the present technology, for each of the at least some of the plurality of lugs the at least one passage has a depth and a diameter, and the depth is greater than the diameter.

In some implementations of the present technology, for each of the at least some of the plurality of lugs the at least one passage has a diameter that is less than a thickness of the lug at a base of the lug and is greater than a thickness of the lug at a tip of the lug.

In some implementations of the present technology, for each of the at least some of the plurality of lugs the at least one passage defines an opening in at least one of a front side and a rear side of the lug.

In some implementations of the present technology, for each of the at least some of the plurality of lugs the at least one passage extends in a longitudinal direction of the endless belt.

In some implementations of the present technology, for each of the at least some of the plurality of lugs the at least one passage extends through the lug and defines the opening in the front side of the lug and an opening in the rear side of the lug.

In some implementations of the present technology, for each of the at least some of the plurality of lugs the at least one passage defines an opening in at least one of a left side and a right side of the lug.

In some implementations of the present technology, for each of the at least some of the plurality of lugs the at least one passage extends in a lateral direction of the endless belt.

In some implementations of the present technology, for each of the at least some of the plurality of lugs the at least one passage extends toward a base of the lug.

In some implementations of the present technology, for each of the at least some of the plurality of lugs the at least one passage defines an opening in a tip of the lug.

In some implementations of the present technology, for each of the at least some of the plurality of lugs the at least one passage extends in a direction normal to the one of the inner surface and the outer surface of the endless belt.

In some implementations of the present technology, for each of the at least some of the plurality of lugs: the lug is made of a first material having a first density, and the at least one passage is at least partially filled with a second material having a second density. The second density is lower than the first density.

In some implementations of the present technology, the at least some of the plurality of lugs are external lugs projecting from the outer surface of the endless belt.

In some implementations of the present technology, the at least some of the plurality of lugs are internal lugs projecting from the inner surface of the endless belt.

In some implementations of the present technology, a plurality of reinforcement rods extends laterally in the endless belt. At least one plane normal to the inner surface of the endless belt and passing through one of the plurality of reinforcement rods passes through the at least one passage of at least one of the at least some of the plurality of lugs.

In some implementations of the present technology, a plurality of cleats is attached to the endless belt. At least one of the passages is laterally aligned with at least one of the cleats.

According to another aspect of the present technology, there is provided a drive track for a tracked vehicle having an endless belt having an inner surface and an outer surface, and a plurality of lugs projecting from at least one of the inner surface and the outer surface. At least some of the plurality of lugs each defines a cavity therein.

According to another aspect of the present technology, there is provided a snowmobile having a frame having a tunnel, a motor supported by the frame, at least one ski operatively connected to the frame, and a drive track according to the above aspect and optionally one or more of the above implementations disposed at least in part under the tunnel and operatively connected to the motor.

For purposes of the present application, terms related to spatial orientation when referring to a snowmobile and components in relation to the snowmobile, such as "forwardly", "rearward", "left", "right", "above" and "below", are as they would be understood by a driver of the snowmobile, with the snowmobile in a straight ahead orientation (i.e. not steered left or right), and in an upright position (i.e. not tilted). When referring to a drive track of the snowmobile alone, terms related to spatial orientation, such as "lateral" and "longitudinal" should be taken with respect to the drive track itself.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6A is a rear elevation view of an alternative implementation of an external lug of the drive track of the snowmobile of FIG. 1;

FIG. 6B is a top plan view of the external lug of FIG. 6A;

FIG. 6C is a right side elevation view of the external lug of FIG. 6A;

FIG. 6D is a cross-sectional view of the external lug of FIG. 6A taken through line 6D-6D of FIG. 6A;

FIG. 7A is a rear elevation view of another alternative implementation of an external lug of the drive track of the snowmobile of FIG. 1;

FIG. 7B is a top plan view of the external lug of FIG. 7A;

FIG. 7C is a right side elevation view of the external lug of FIG. 7A;

FIG. 7D is a cross-sectional view of the external lug of FIG. 7A taken through line 7D-7D of FIG. 7A;

FIG. 9A is a rear elevation view of another alternative implementation of an external lug of the drive track of the snowmobile of FIG. 1;

FIG. 9B is a top plan view of the external lug of FIG. 9A;

FIG. 9C is a right side elevation view of the external lug of FIG. 9A;

DETAILED DESCRIPTION

Implementations of a drive track will be described herein in combination with a snowmobile 10. It is contemplated that the implementations of the drive track or some aspects thereof could be used on drive tracks of other tracked vehicles.

Figure 1:
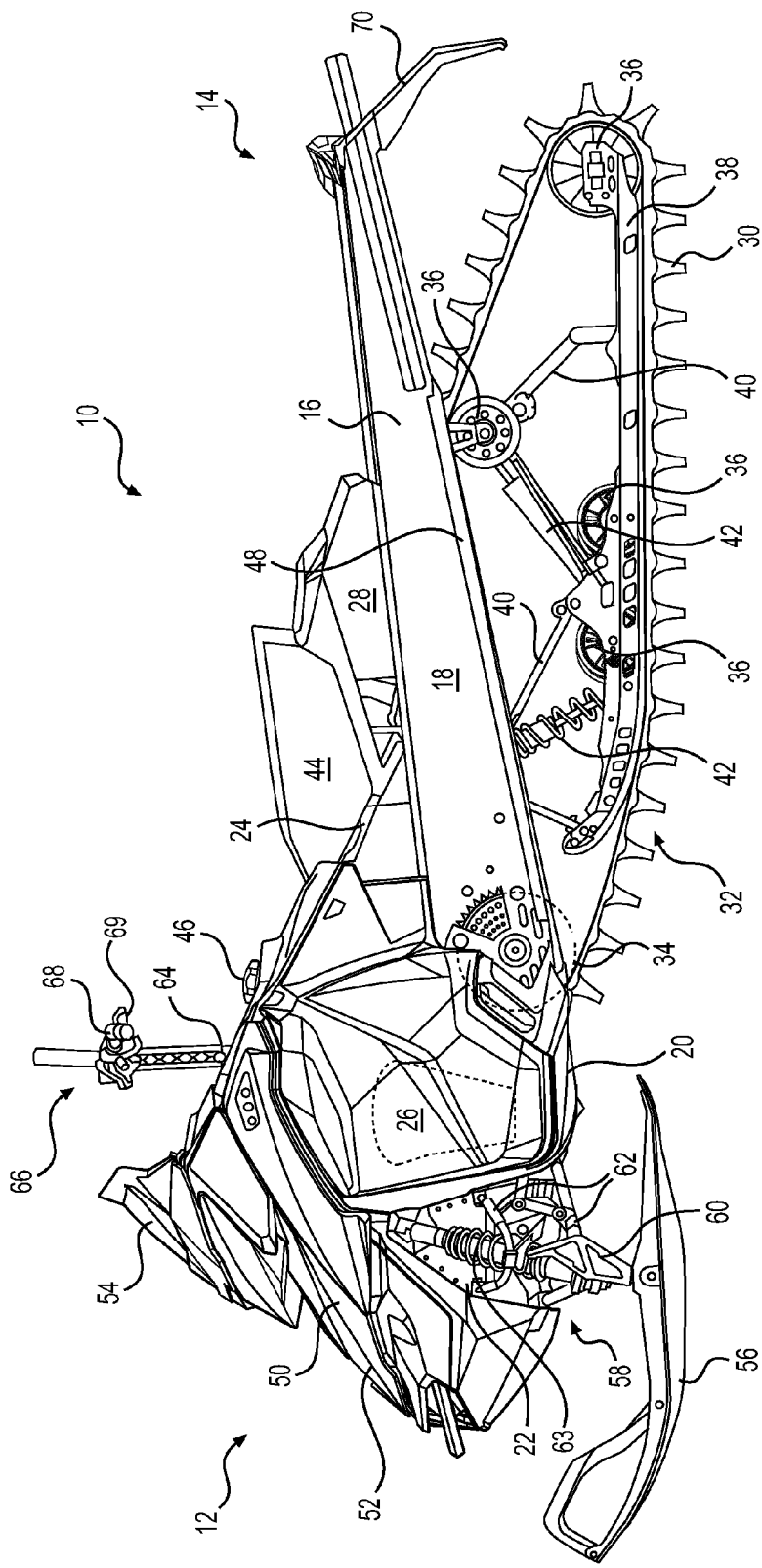
FIG. 1 is a left side elevation view of a snowmobile.

Referring to FIG. 1, a snowmobile 10 includes a forward end 12 and a rearward end 14. The snowmobile 10 includes a vehicle body in the form of a frame or chassis 16 which includes a tunnel 18, an engine cradle portion 20, a front suspension module 22 and an upper structure 24.

A motor 26 (schematically illustrated), which in the illustrated implementation is an internal combustion engine, is carried in an engine compartment defined in part by the engine cradle portion 20 of the frame 16. A fuel tank 28, supported above the tunnel 18, supplies fuel to the engine 26 for its operation.

An endless drive track 30 is positioned at the rear end 14 of the snowmobile 10. The drive track 30 is disposed generally under the tunnel 18, and is operatively connected to the engine 26 through a belt transmission system (not shown) and a reduction drive (not shown). The endless drive track 30 is driven to run about a rear suspension assembly 32 connected to the frame 16 for propulsion of the snowmobile 10. The endless drive track 30 will be described in greater detail below.

The rear suspension assembly 32 includes drive sprockets 34, idler wheels 36 and a pair of slide rails 38 in sliding contact with the endless drive track 30. The slide rails 38 are attached to the tunnel 18 by front and rear suspension arms 40 and shock absorbers 42. It is contemplated that the snowmobile 10 could be provided with a different implementation of a rear suspension assembly 32 than the one described above.

A straddle seat 44 is positioned atop the fuel tank 28. A fuel tank filler opening covered by a cap 46 is disposed on the upper surface of the fuel tank 28 in front of the seat 44. It is contemplated that the fuel tank filler opening could be disposed elsewhere on the fuel tank 28. The seat 44 is adapted to accommodate a driver of the snowmobile 10. The seat 44 could also be configured to accommodate a passenger. A footrest 48 is positioned on each side of the snowmobile 10 below the seat 44 to accommodate the driver's feet.

At the front end 12 of the snowmobile 10, fairings 50 enclose the engine 26 and the belt transmission system, thereby providing an external shell that not only protects the engine 26 and the transmission system, but can also make the snowmobile 10 more aesthetically pleasing. The fairings 50 include a hood 52 and one or more side panels which can be opened to allow access to the engine 26 and the belt transmission system when this is required, for inspection or maintenance of the engine 26 and/or the transmission system for example. A windshield 54 connected to the fairings 50 acts as a wind screen to lessen the force of the air on the rider while the snowmobile 10 is moving.

Two skis 56 positioned at the forward end 12 of the snowmobile 10 are attached to the front suspension module 22 of the frame 16 through front suspension assemblies 58. The front suspension module 22 is connected to the front end of the engine cradle portion 20. Each front suspension assembly 58 includes a ski leg 60, supporting arms 62, ball joints (not shown) for operatively connecting the supporting arms 62 to the ski leg 60, and a shock absorber 63.

A steering assembly 66, including a steering column 64 and a handlebar 68, is provided generally forward of the seat 44. The steering column 64 is rotatably connected to the frame 16. The lower end of the steering column 64 is connected to the ski legs 60 via steering rods (not shown). The handlebar 68 is attached to the upper end of the steering column 64. The handlebar 68 is positioned in front of the seat 44. The handlebar 68 is used to rotate the steering column 64, and thereby the skis 56, in order to steer the snowmobile 10. A throttle operator (not shown) in the form of a finger-actuated throttle lever is mounted to the right side of the handlebar 68. Other types of throttle operators, such as a thumb-actuated throttle lever and a twist grip, are also contemplated. A brake actuator, in the form of a hand brake lever 69, is provided on the left side of the handlebar 68 for braking the snowmobile 10 in a known manner. It is contemplated that the windshield 54 could be connected directly to the handlebar 68.

At the rear end of the snowmobile 10, a snow flap 70 extends downward from the rear end of the tunnel 18. The snow flap 70 protects against dirt and snow that can be projected upward from the drive track 30 when the snowmobile 10 is being driven. It is contemplated that the snow flap 70 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 2:
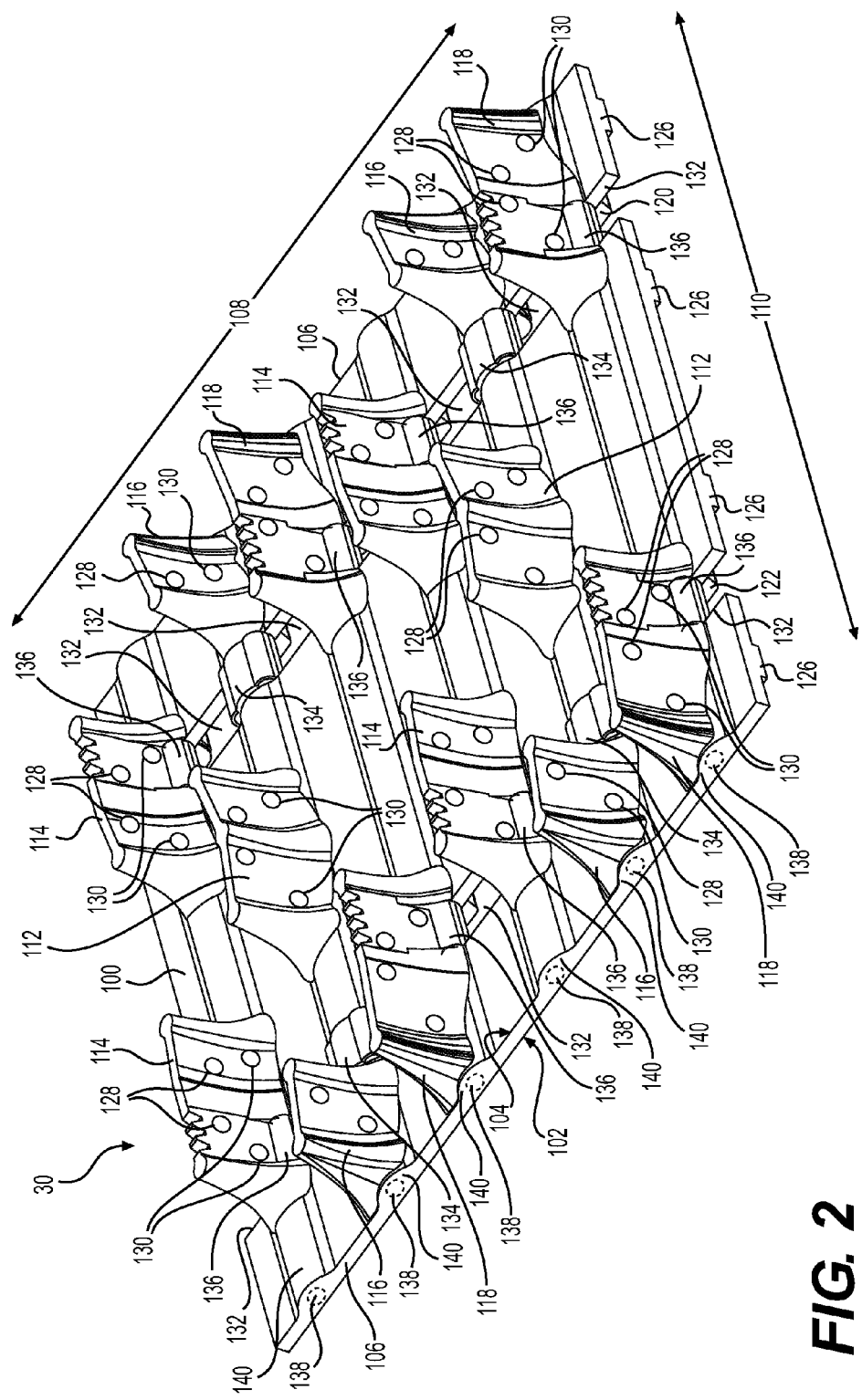
FIG. 2 is a perspective view taken from a rear, left side of a portion of a drive track of the snowmobile of FIG. 1.
Figure 3:
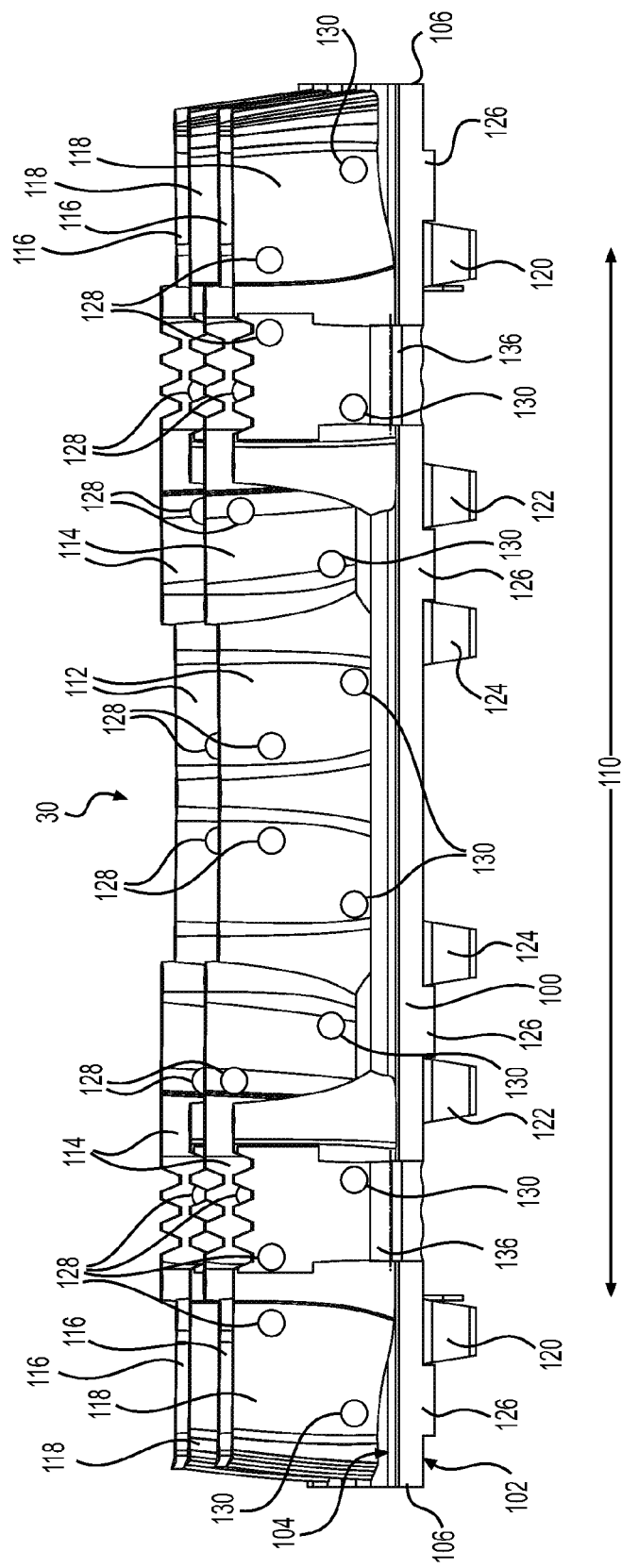
FIG. 3 is a rear elevation view of the drive track portion of FIG. 2.
Figure 4:
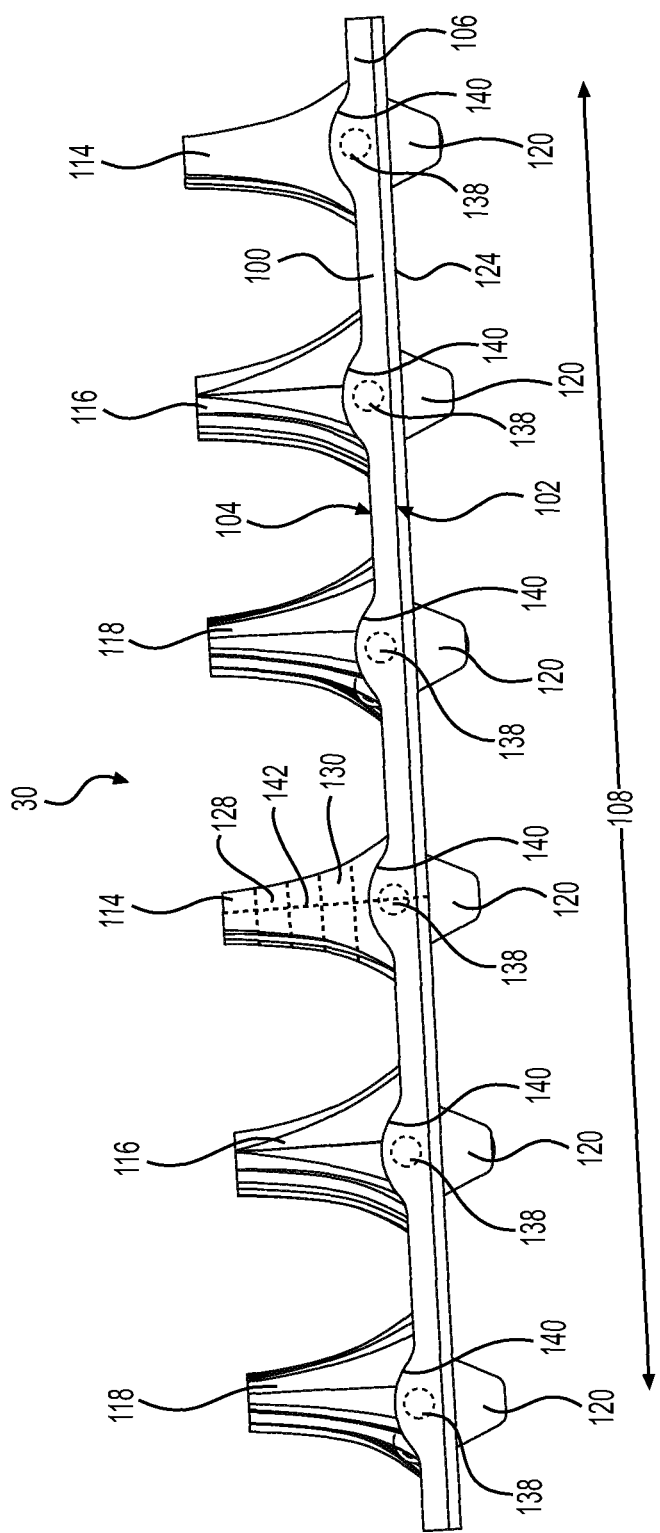
FIG. 4 is a right side elevation view of the drive track portion of FIG. 2.

Turning now to FIGS. 2 to 4, the endless drive track 30 will be described in more detail. The endless drive track 30 has an endless flexible belt 100 which has an inner surface 102, an outer surface 104 and lateral edges 106. The endless drive track 30 defines a longitudinal direction 108 and a lateral direction 110 for the drive track 30. In the description of the drive track 30 below, the terms "longitudinal" and "lateral" are used with respect to the respective directions as defined by the drive track 30.

The endless drive track 30 includes a plurality of external lugs 112, 114, 116 and 118 that project outwardly from the outer surface 104 and a plurality of internal lugs 120, 122, and 124 that project inwardly from the inner surface 102. The plurality of external lugs 112, 114, 116 and 118 provide the endless drive track 30 with traction as the drive track 30 propels the snowmobile 10. The internal lugs 120, 122, and 124 are engaged by axial teeth (not shown) of the drive sprockets 34 so as to move the belt 100 around the suspension assembly 32. The drive track 30 also includes a number of bands 126 extending longitudinally along the inner surface 102. The bands 126 provide a surface along which the wheels 36 can roll. It is contemplated that the bands 126 could be omitted such that the wheels 36 would roll directly on the inner surface 102 of the endless belt 100.

The endless drive track 30 is made of a strong, flexible material such as rubber reinforced with fabric and metal. The endless belt 100, the external lugs 112, 114, 116, 118, the internal lugs 120, 122, 124, and the bands 126 are integrally formed with each other.

As best seen in FIGS. 3 and 4, the internal lugs 120, 122, 124 project inwards from the inner surface 102 of the endless belt 100. The plurality of internal lugs 120, 122, 124 form two longitudinally extending rows of internal lugs 120 disposed near the edges 106 of the endless belt 100, two longitudinally extending rows of internal lugs 122 disposed laterally inward of the internal lugs 120, and two longitudinally extending rows of internal lugs 124 disposed laterally inward of the internal lugs 122. The internal lugs 120 are aligned with the internal lugs 122 and the internal lugs 124 in the longitudinal direction 108 so as to form laterally extending rows. It is however contemplated that some or all of the internal lugs 120 could be offset from the corresponding lugs 122 and/or 124. Similarly some or all the lugs 122 could be offset from the corresponding lugs 124. The internal lugs 120 and 122 come in contact with the drive sprockets 34. The internal lugs 120 and 122 also come in contact with the slide rails 34 for ensuring that the endless belt 100 stays in alignment. The internal lugs 122 and 1124 contact the idler wheels 36. All of the internal lugs 120, 122, and 124 are identical to each other in the implementation shown in FIGS. 2 to 4. It is contemplated however that the lugs 120, 122, and 124 could be different from each other.

As best seen in FIG. 3, two bands 126 are disposed laterally outward of the internal lugs 120 and two bands 126 are disposed between the internal lugs 122 and the internal lugs 124.

As best seen in FIGS. 2 and 3, the external lugs 112, 114, 116 and 118 project outwards from the outer surface 104 of the endless belt 100. The plurality of external lugs 112, 114, 116 and 118 form two longitudinally extending rows of external lugs 118 disposed adjacent the edges 106 of the endless belt 100, two longitudinally extending rows of external lugs 116 also disposed adjacent the edges 106 of the endless belt 100, two longitudinally extending rows of external lugs 114 disposed laterally inward of the edges 106 of the endless belt 100, and one longitudinally extending row of external lugs 112 disposed along a lateral center of the endless belt 100. As can be seen in FIG. 2, the pattern of external lugs 112, 114, 116 and 118 consists in one laterally extending row containing two external lugs 118, followed by one laterally extending row containing two external lugs 116 and one external lug 112, followed by one laterally extending row containing two external lugs 114, and the pattern is repeated in the longitudinal direction 108 along the entire periphery of the endless belt 100.

The external lugs 112, 114 and 118 each have two upper passages 128 and two lower passages 130 and the external lugs 116 each have on upper passage 128 and one lower passage 130. The passages 128 and 130 extend in the longitudinal direction 108 completely through their respective external lugs 112, 114, 116 and 118 as will be explained in greater detail below with respect to one of the external lugs 118. It is contemplated that only some of the external lugs 112, 114, 116 and 118 could be provided with the passages 128, 130. It is also contemplated that the position of the passages 128, 130 in the external lugs 112, 114, 116, 118 could be different than illustrated. It is also contemplated that the external lugs 112, 114, 116, 118 could have more or less passages 128, 130 than illustrated and that they could not have passages 128 or 130. It should be noted that for clarity of the Figures, only some of the passages 128 and 130 have been labelled in the Figures.

A plurality of longitudinally spaced apertures (or windows) 132 are defined in the endless belt 100. Each aperture 132 extends through the belt 100 between the inner and outer surfaces 102 and 104. The apertures 132 are disposed in two longitudinal rows. It is contemplated that the plurality of longitudinally spaced apertures 132 could form only one longitudinal row or more than two longitudinal rows. The apertures 132 are engaged by the radial sprocket teeth (not shown) of the drive sprockets 34 for moving the belt 100. It is contemplated that the plurality of longitudinally spaced apertures 132 could be omitted for use with sprockets 34 without radial teeth 100.

The endless drive track 30 also has cleats 134 mounted between the apertures 132 and cleats 136 mounted to the base of each external lug 114 and 118. As can be seen in FIG. 2, the cleats 134 and 136 are arranged in two longitudinally extending row of alternating cleats 134 and 136. As best seen in FIG. 2, the laterally innermost passages 128 and 130 of the external lugs 118 and the laterally outermost passages 128 and 130 of the external lugs 114 are laterally aligned with their corresponding row of cleats 134, 136.

Reinforcement rods 138 extend laterally inside the endless belt 100 between the inner and outer surfaces 102, 104. One reinforcement rod 138 is provided in alignment with each laterally extending row of external lugs 112, 114, 116, 118. It is contemplated that not every laterally extending row of external lugs 112, 114, 116, 118 could be provided with reinforcement rod 138. It is also contemplated that reinforcement rods 138 could be provided longitudinally between laterally extending rows of external lugs 112, 114, 116, and 118. The reinforcement rods 138 are fiberglass rods, but it is contemplated that other materials could be used, such as carbon fiber or metal for example. As can be seen in FIGS. 2 and 4, each reinforcement rod 138 forms a ridge 140 extending laterally along the outer surface 104 between the lateral edges 106 of the endless belt 100. As can be seen in FIG. 4 for one set of passages 128, 130 in one of the external lugs 114, since the passages 128 extend longitudinally through the external lugs 112, 114, 116, 118 and the external lugs 112, 114, 116, 118 are disposed over the laterally extending rods 138, planes 142 normal to the inner surface 102 of the endless belt 100 and passing laterally through the rods 138 also pass through the external lugs 112, 114, 116, 118 disposed on top of their corresponding rods 138 and their corresponding passages 128, 130.

Turning now to FIGS. 5A to 5D, one of the external lugs 118 disposed on a right side of the track 30 will be described in more detail. The external lugs 118 disposed on a left side of the track 30 are a mirror image of the external lugs 118 on the right side of the track 30. The external lugs 116 are similar to the half of the external lugs 118 which is not provided with teeth 144. The external lugs 114 on the left side of the track 30 are identical to the external lugs 118 on the right side of the track 30 and the external lugs 114 on the right side of the track 30 are identical to the external lugs 118 on the left side of the track 30. The external lugs 112 are similar to the external lugs 118, but do not have teeth 144. As such, the external lugs 118 on the left side of the track 30 and the external lugs 112, 114 and 116 will not be described in detail herein.

Figure 5C:
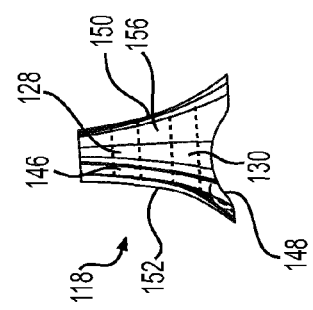
FIG. 5C is a right side elevation view of the external lug of FIG. 5A.
Figure 5D:
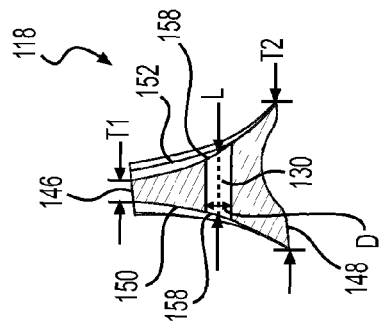
FIG. 5D is a cross-sectional view of the external lug of FIG. 5A taken through line 5D-5D of FIG. 5A.
Figure 5A:
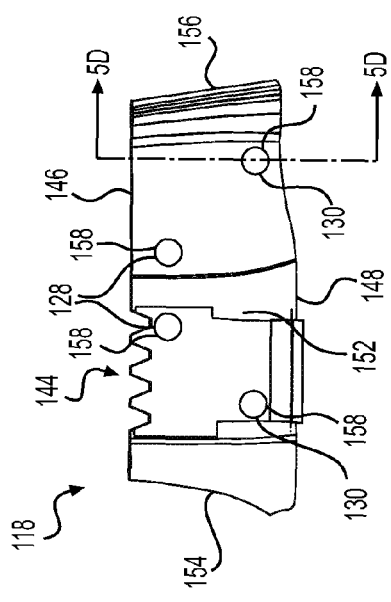
FIG. 5A is a rear elevation view of an external lug of the drive track of the snowmobile of FIG. 1.
Figure 5B:
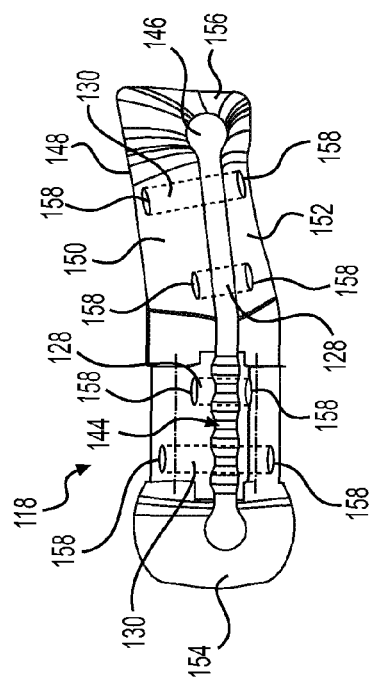
FIG. 5B is a top plan view of the external lug of FIG. 5A.

The external lug 118 illustrated in FIGS. 5A to 5D has a tip 146, a base 148, a front side 150, a rear side, 152, a left side 154 and a right side 156. As best seen in FIG. 5A, a portion of the tip 146 defines teeth 144. As described above, the passages 128, 130 extend longitudinally and completely through the external lug 118. As such, each passage 128, 130 defines an opening 158 in the front side 150 of the lug 118 and another opening 158 in the rear side 152 of the lug 118. The passages 130 each have a corresponding diameter D and a corresponding depth L measured along their respective centers. As can be seen in FIG. 5D, the depth L of a passage 130 is greater than the diameter D of the passage 130. Similarly, the depth of each of the passages 128 is greater than their corresponding diameters. As can also be seen in FIG. 5D, the diameter D of a passage 130 is greater than the thickness T1 of the tip 146 and less than the thickness T2 of the base 148. The thicknesses T1 and T2 are measured at a position laterally aligned with the center of the passage 130. Similarly, the diameter of each of the passages 128 is greater than the corresponding thickness of the tip 146 and less than the corresponding thickness of the base 148. It is contemplated that the diameters of the passages 128, 130 could be greater than their corresponding thicknesses of the base 148 or could be smaller than their corresponding thicknesses of the tip 146.

Turning now to FIGS. 6A to 10D, alternative implementations of the external lug 118 will now be described. For simplicity, elements of the alternative implementations that are similar to those of the external lug 118 described above have been labeled with the same reference numerals in the Figures and will not be described again. The features of the alternative implementations 6A to 10D could also be applied to the external lugs 112, 114 and 116.

FIGS. 6A to 6D illustrate an external lug 218. In the external lug 218, the passages 128 and 130 have been replaced by passages 228 and 230 respectively. The passages 228 and 230 extend in the longitudinal direction 108. The passages 228 and 230 do not extend completely through the external lug 218. One passage 228 and one passage 230 each define an opening 158 in the front side 150 of the external lug 218. One passage 228 and one passage 230 each define an opening 158 in the rear side 152 of the external lug 218. It is contemplated that all of the passages 228 and 230 could define their respective openings 158 in only one of the front and rear sides 150, 152. It is contemplated that the external lug 218 could have more or less passages 228, 230 than illustrated. It is also contemplated that the passages 228, 230 could be disposed in a pattern that is different than the one illustrated. For example, the external lug 218 could have three passages 228 dispose laterally next to each other at a vertical center of the external lug 218. As can be seen in FIG. 6D, the depth L1 of a passage 228 is greater than the diameter D1 of the passage 228. Similarly, the depth L2 of a passage 230 is greater than the diameter D2 of the passage 230. As can also be seen in FIG. 6D, the diameters D1 and D2 of the passages 228 and 230 are greater than the thickness T1 of the tip 146 and less than the thickness T2 of the base 148.

FIGS. 7A to 7D illustrate an external lug 318. The external lug 318 is identical to the external lug 118 except that the passages 128 and 130 have been filled with a material 320. The material 320 has a density that is lower than the density of the material from which the external lug 318 is made. For example, in the case of an external lug 318 made of rubber, the material 320 could be a foam. It is contemplated that the passages 128 and 130 could be only partially filled with the material 320. It is contemplated that the passages of the other implementations of external lugs described herein could also be filled with a material having a density that is lower than the density of the material from which the external lugs are made.

Figure 8C:
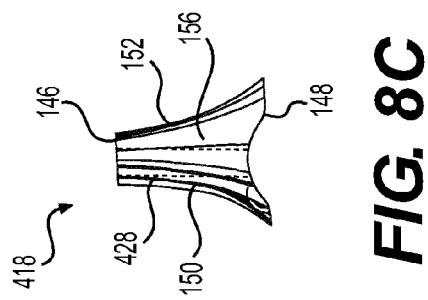
FIG. 8C is a right side elevation view of the external lug of FIG. 8A.
Figure 8A:
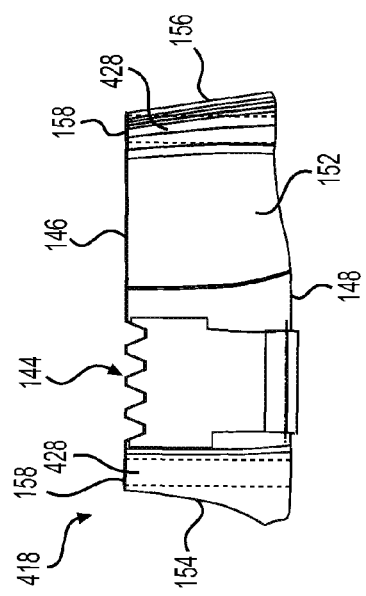
FIG. 8A is a rear elevation view of another alternative implementation of an external lug of the drive track of the snowmobile of FIG. 1.
Figure 8B:
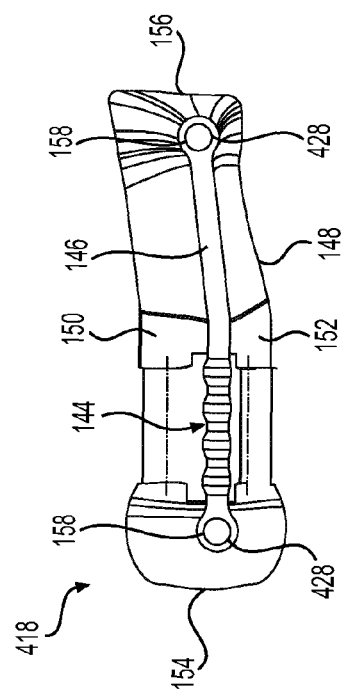
FIG. 8B is a top plan view of the external lug of FIG. 8A.
Figure 10C:
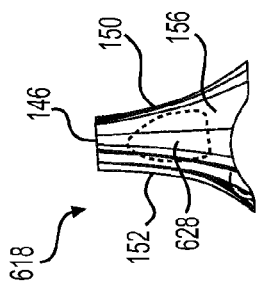
FIG. 10C is a right side elevation view of the external lug of FIG. 10A.
Figure 10D:
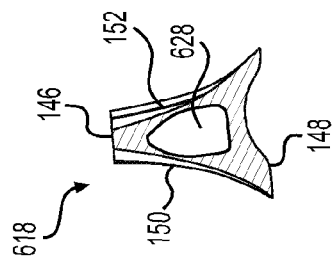
FIG. 10D is a cross-sectional view of the external lug of FIG. 10A taken through line 10D-10D of FIG. 10A.
Figure 10A:
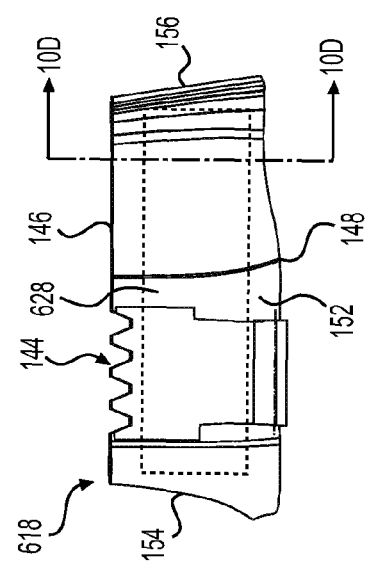
FIG. 10A is a rear elevation view of another alternative implementation of an external lug of the drive track of the snowmobile of FIG. 1.
Figure 10B:
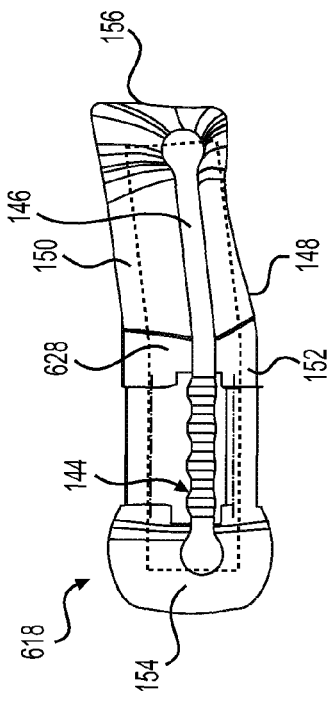
FIG. 10B is a top plan view of the external lug of FIG. 10A.

FIGS. 8A to 8C illustrate an external lug 418. In the external lug 418, the passages 128 and 130 have been replaced by passages 428. The passages 428 define openings 158 in the tip 146 of the external lug 418 and extend toward the base 148 of the external lug 418. The passages 428 extend through the external lug 418 in a direction that is normal to the inner surface 102 of the belt 100. It is contemplated that the passages 428 could extend toward the base 148 at an angle. It is also contemplated that the passages 428 could only extend partially through the external lug 418. It is also contemplated that there could be only one or more than two passages 428.

FIGS. 9A to 9C illustrate an external lug 518. In the external lug 518, the passages 128 and 130 have been replaced by passages 528. The passages 528 define openings 158 in the left and right sides 154, 156 of the external lug 418 and extend laterally and toward the base 148 of the external lug 518. As such, the passages 528 extend through the external lug 518 at an angle to the inner surface 102 of the belt 100. It is contemplated that the passages 528 could extend horizontally. It is also contemplated that the passages 528 could not extend all the way to the base 148 of the external lug 518. It is also contemplated that the passages 528 could extend from one of the left and right sides 154, 156 to the other one of the left and right sides 154, 156. It is also contemplated that there could be only one or more than two passages 528.

The passages described above can be formed by placing inserts in the mold when molding the track 30 or can be formed during a post-molding process, such as by drilling for example. Although all of the passages described above have a circular cross-section, it is contemplated that they could have a cross-section other than circular.

FIGS. 10A to 10D illustrate an external lug 618. In the external lug 618, the passages 128 and 130 have been replaced by a cavity 628 defined inside the external lug 618. In one implementation, the cavity 628 is formed by a hollow capsule place in the mold used to make the track 30.

It is contemplated that external lugs could combine more than one of the types of passages described above. For example, an external lug could have the passages 128 and 130 and also have the passages 428. It is also contemplated that external lugs could define a cavity therein instead of or in addition to passages. It is also contemplated that the track 30 could have more than one implementation of external lug thereon. For example, the track 30 could have external lugs 118 as described above, but with the external lugs 112 replaced with external lugs having passages of the type described above with respect to the external lug 418.

Figure 11A:
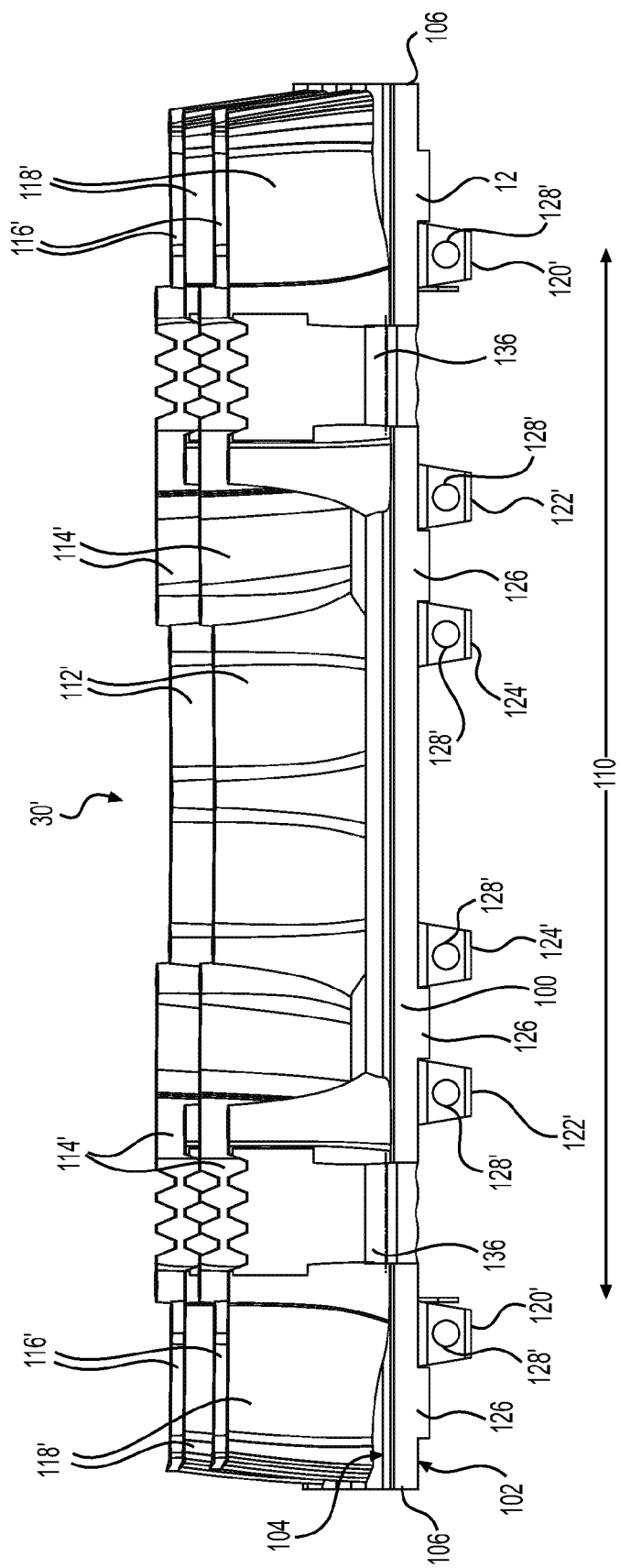
FIG. 11A is a rear elevation view of a portion of a drive track of the snowmobile of FIG. 1 having an alternative implementation on an internal lug.
Figure 11B:
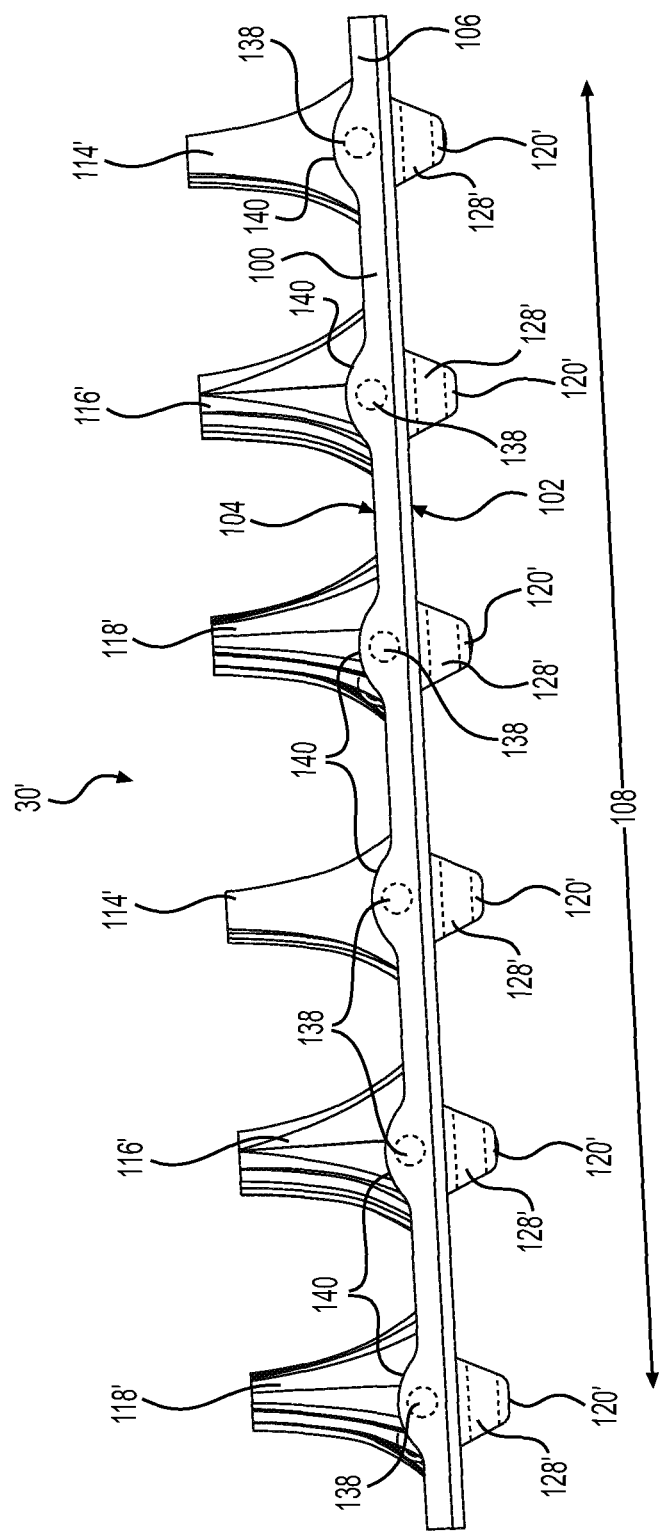
FIG. 11B is a right side elevation view of the drive track portion of FIG. 11A.

Turning now to FIGS. 11A and 11B, a track 30' which is an alternative implementation of the track 30 will be described. For simplicity, elements of the track 30' that are similar to those of the track 30 described above have been labeled with the same reference numerals in the Figures and will not be described again.

In the track 30', the external lugs 112, 114, 116 and 118 of the track 30 have been replaced with external lugs 112', 114', 116' and 118' respectively. The external lugs 112', 114', 116' and 118' have the same shape as the external lugs 112, 114, 116 and 118 but do not have the passages 128 and 130. It is contemplated that some or all of the external lugs 112', 114', 116' and 118' could be provided with passages 128 and 130 or any other passages and cavities described above and combinations thereof. In the track 30', the internal lugs 120, 122 and 124 of the track 30 have been replaced with internal lugs 120', 122' and 124'. The internal lugs 120', 122' and 124' are each provided with a passage 128' extending longitudinally therethrough, similar to the passages 128 of the external lug 118 described above. It is contemplated that the internal lugs 120', 122' and 124' could each have more than one passage 128'. It is also contemplated that some of the internal lugs 120', 122' and 124' could not have a passage 128'. It is contemplated that the internal lugs 120', 122' and 124' could be provided with any one of the types of passages described above with respect to the external lugs and combinations thereof. It is also contemplated that the internal lugs 120', 122' and 124' could each define a cavity therein instead of or in addition to a passage.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A drive track for a tracked vehicle comprising:
   an endless belt having an inner surface and an outer surface; and
   a plurality of lugs projecting from at least one of the inner surface and the outer surface,
   each of the plurality of lugs having:
      a base adjacent the at least one of the inner surface and the outer surface;
      a tip opposite the base;
      a front side extending between the base and the tip; and
      a rear side extending between the base and tip, the rear side being opposite the front side;
   at least some of the plurality of lugs each having at least one passage,
   the at least one passage extending at least partially through the lug, and
   the at least one passage defining an opening in at least one of the front side and the rear side of the lug.

2. The drive track of claim 1, wherein for each of the at least some of the plurality of lugs the at least one passage extends completely through the lug.

3. The drive track of claim 1, wherein for each of the at least some of the plurality of lugs the at least one passage has a depth and a diameter; and
   wherein the depth is greater than the diameter.

4. The drive track of claim 1, wherein for each of the at least some of the plurality of lugs the at least one passage has a diameter that is less than a thickness of the lug at the base of the lug and is greater than a thickness of the lug at the tip of the lug.

5. The drive track of claim 1, wherein for each of the at least some of the plurality of lugs the at least one passage extends in a longitudinal direction of the endless belt.

6. The drive track of claim 5, wherein for each of the at least some of the plurality of lugs the at least one passage extends through the lug and defines the opening in the front side of the lug and an opening in the rear side of the lug.

7. The drive track of claim 1, wherein for each of the at least some of the plurality of lugs:
   the lug is made of a first material having a first density; and
   the at least one passage is at least partially filled with a second material having a second density, the second density being lower than the first density.

8. The drive track of claim 1, wherein the at least some of the plurality of lugs are external lugs projecting from the outer surface of the endless belt.

9. The drive track of claim 1, wherein the at least some of the plurality of lugs are internal lugs projecting from the inner surface of the endless belt.

10. The drive track of claim 1, further comprising a plurality of reinforcement rods extending laterally in the endless belt; and
   wherein at least one plane normal to the inner surface of the endless belt and passing through one of the plurality of reinforcement rods passes through the at least one passage of at least one of the at least some of the plurality of lugs.

11. The drive track of claim 1, further comprising a plurality of cleats attached to the endless belt; and
   wherein at least one of the passages is laterally aligned with at least one of the cleats.

12. A snowmobile comprising:
   a frame having a tunnel;
   a motor supported by the frame;
   at least one ski operatively connected to the frame; and
   a drive track disposed at least in part under the tunnel and operatively connected to the motor, the drive track having:
      an endless belt having an inner surface and an outer surface; and
      a plurality of lugs projecting from at least one of the inner surface and the outer surface, each of the plurality of lugs having:
         a base adjacent the at least one of the inner surface and the outer surface;
         a tip opposite the base;
         a front side extending between the base and the tip; and
         a rear side extending between the base and tip, the rear side being opposite the front side;
      at least some of the plurality of lugs each having at least one passage,
      the at least one passage extending at least partially through the lug, and
      the at least one passage defining an opening in at least one of the front side and the rear side of the lug.

13. The drive track of claim 1, wherein for each of the plurality of lugs a thickness of the tip is less than a thickness of the base.

14. The drive track of claim 13, wherein for each of the plurality of lugs a dimension of the tip in a lateral direction of the endless belt is less than a dimension of the base in the lateral direction.

15. The drive track of claim 1, wherein for each of the plurality of lugs a dimension of the tip in a lateral direction of the endless belt is less than a dimension of the base in the lateral direction.

16. The drive track of claim 1, wherein the plurality of lugs is integral with the endless belt.

* * * * *